Sept. 2, 1952 — A. M. MOEN — 2,609,206
MIXING FAUCET
Filed Sept. 7, 1946 — 4 Sheets-Sheet 1
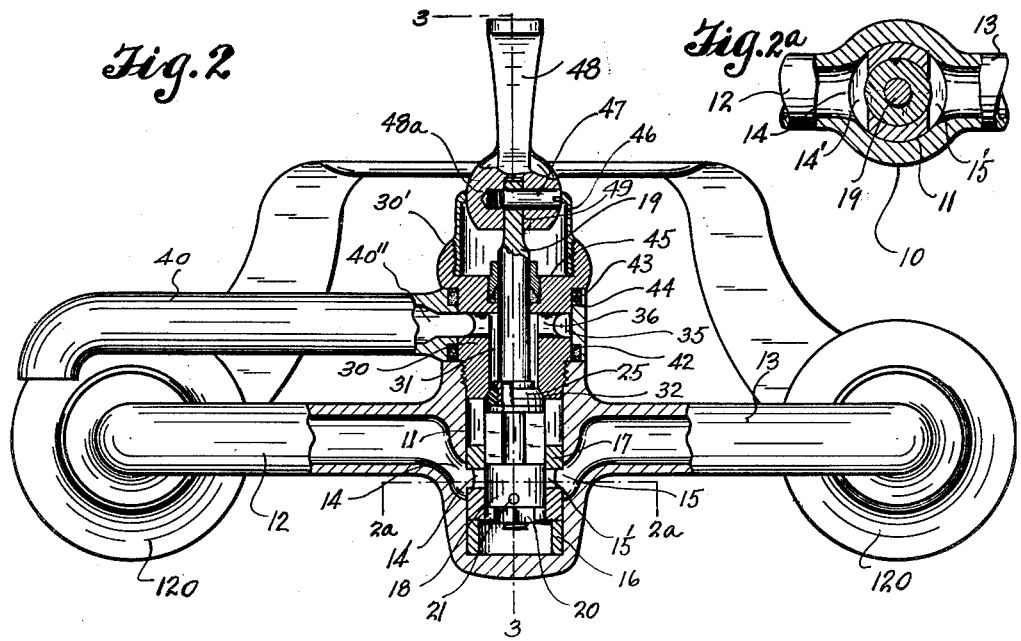
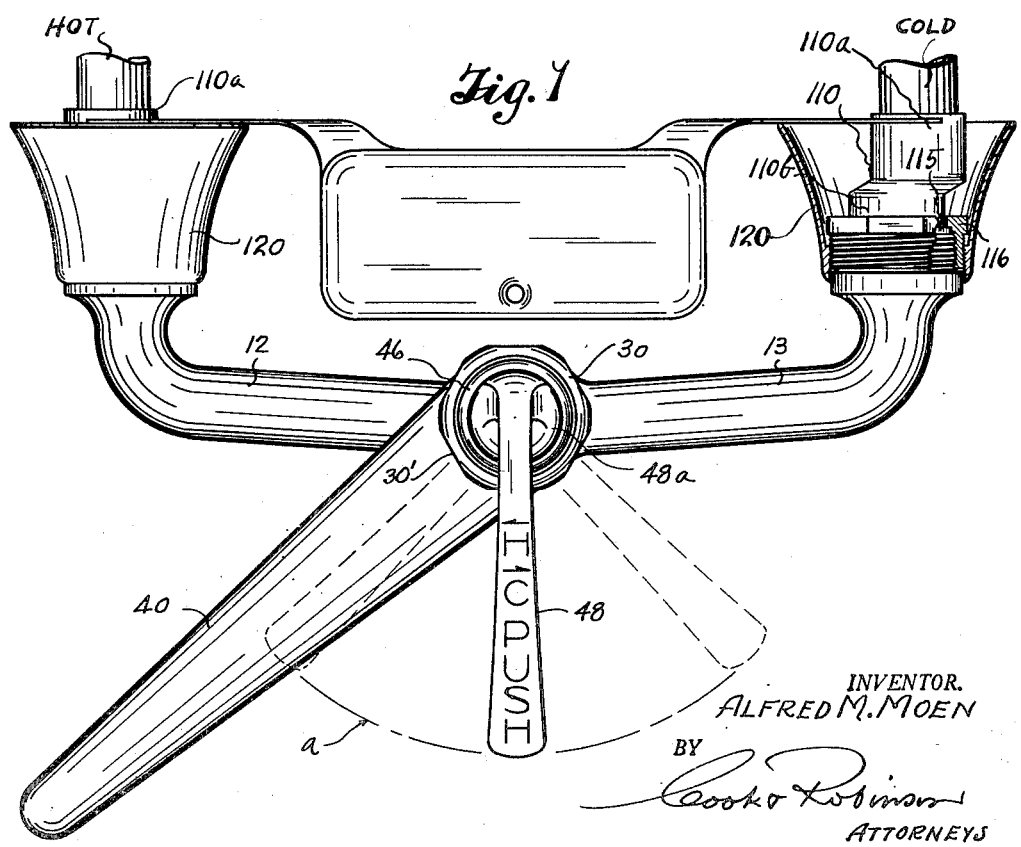
INVENTOR.
ALFRED M. MOEN
BY
Cook & Robinson
ATTORNEYS

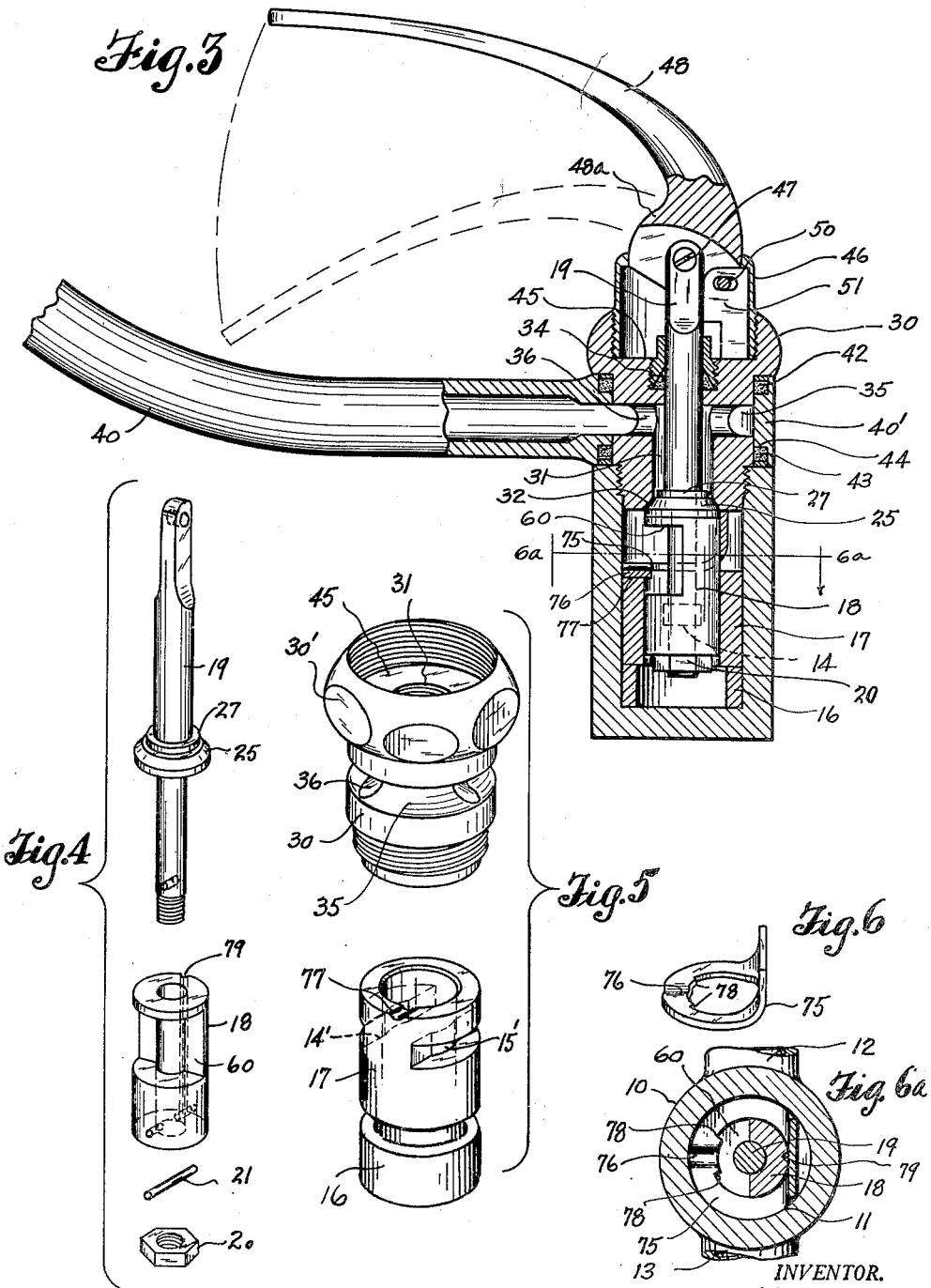

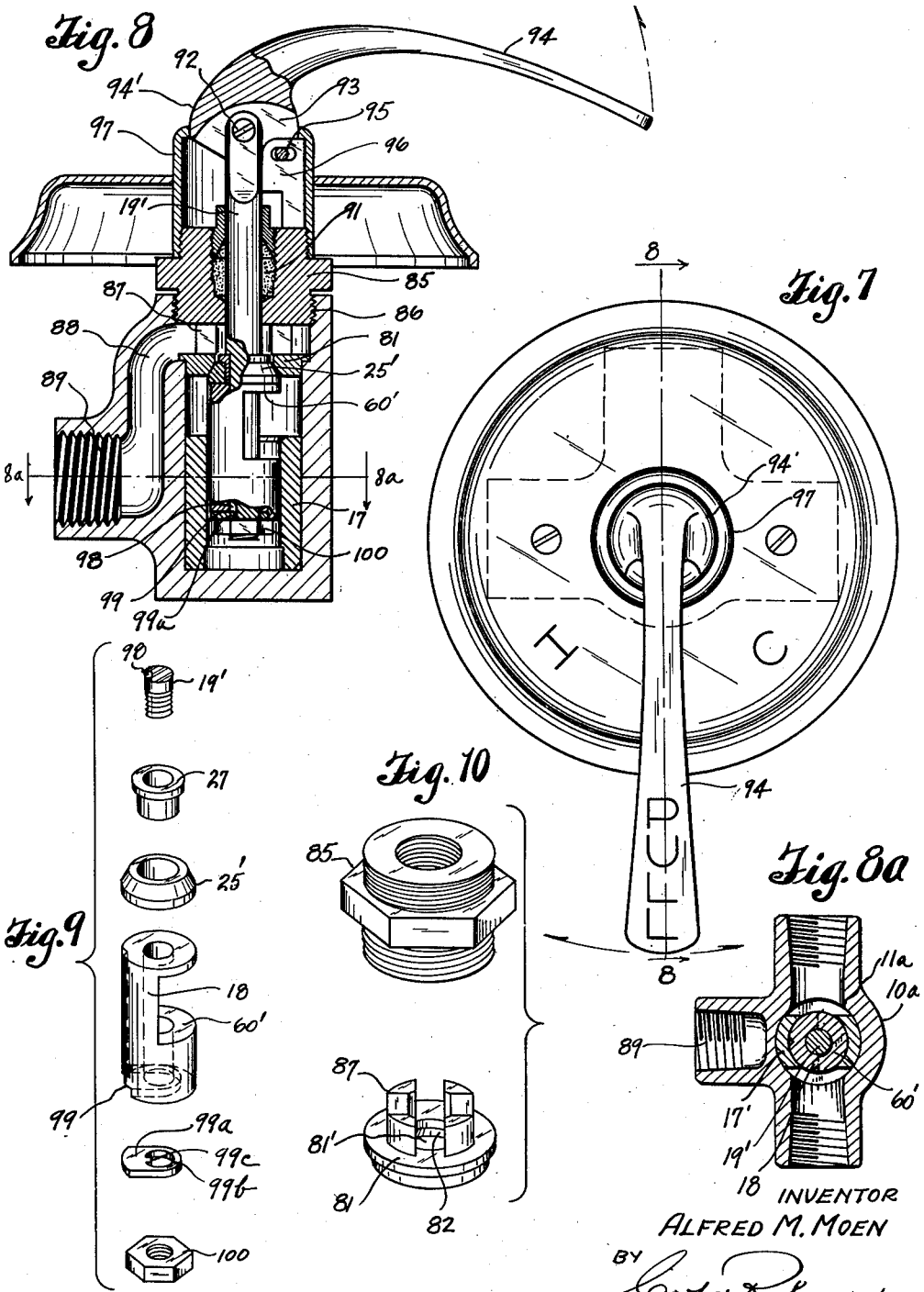

Sept. 2, 1952　　　　A. M. MOEN　　　　2,609,206
MIXING FAUCET
Filed Sept. 7, 1946　　　　　　　　　　　　4 Sheets-Sheet 4
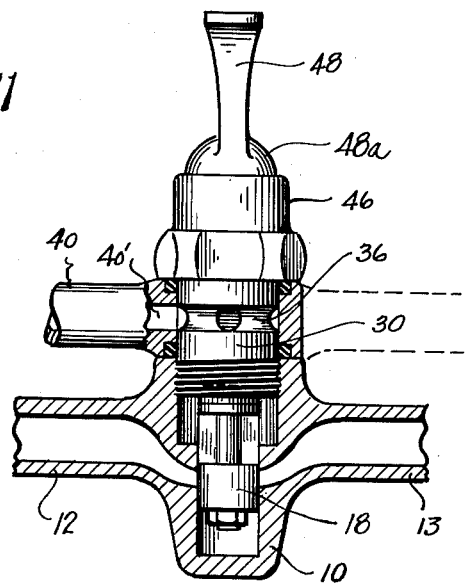
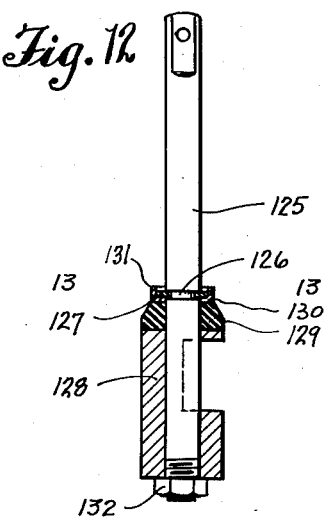
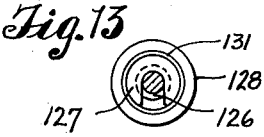
INVENTOR
ALFRED M. MOEN
BY
Cook & Robinson
ATTORNEYS Patented Sept. 2, 1952

2,609,206

UNITED STATES PATENT OFFICE 2,609,206

MIXING FAUCET

Alfred Melvin Moen, Seattle, Wash., assignor of one-tenth to Robert O. Boyker, Seattle, Wash.

Application September 7, 1946, Serial No. 695,481

7 Claims. (Cl. 277—12)

This invention relates to faucets and valve structures, and has reference more particularly to devices of that kind known as mixing faucets or mixing valves, and which are especially adapted for use in connection with bath tubs, sinks, laundry trays and other appliances where hot and cold water is to be controlled through the use of faucets or valves.

It is the principal object of this invention to provide novel improvements in faucets of that kind embodying a single piston-type valve element therein, which element may be longitudinally adjusted to regulate the volume flow of water through the faucet, and may be rotatably adjusted to vary the proportionate amounts of hot and cold water, to any extent ranging between all cold and all hot water.

It is also an object of this invention to provide a faucet which is in the nature of an improvement upon the faucet described and illustrated in my U. S. Patent No. 2,373,702, issued in April 17, 1945, and also in the structures of my co-pending applications filed under Serial Nos. 588,091, filed April 13, 1945, and 630,185, now abandoned, particularly in the design of the valve member, and in details of the valve handle and the spout mounting member, whereby a less expensive, longer wearing, and more practical structure is provided.

It is also an object of my invention to provide an improved means in connection with the rotary valve, to limit its extent of rotation in opposite directions. Also, to provide means for easy adaptation of the faucet connections with hot and cold water pipes.

Yet another object of the invention is to simplify the design of the various parts so as to facilitate manufacture and assembly, and insure accuracy and satisfactory operation.

Other objects of the invention reside in the details of construction and combination of parts and in their mode of operation as will hereinafter be described.

In accomplishing these and other objects of the invention, I have provided the improved details of construction, the preferred forms of which are illustrated in the accompanying drawings, wherein, Fig. 1 is a top view of a mixing faucet embodying the present invention therein.

Fig. 2 is a front view of the same, showing the valve structure in central section for better understanding.

Fig. 2a is a cross section on line 2a—2a in Fig. 2.

Fig. 3 is a section of the valve structure taken substantially on line 3—3 in Fig. 2.

Fig. 4 is a view showing in perspective and in disconnected relationship for better understanding, the valve member, its stem and means for affixing the stem to the valve member.

Fig. 5 is a perspective view of the valve sleeve and the retaining plug which serves as a mounting member for the spout and handle.

Fig. 6 is a perspective view of the limiting washer for use in connection with the rotatably adjustable valve.

Fig. 6a is a cross section taken on line 6a—6a in Fig. 3.

Fig. 7 is a top view of a valve structure of an alternative form.

Fig. 8 is a section in a vertical plane taken substantially on the line 8—8 in Fig. 7.

Fig. 8a is a section at a reduced scale, taken on line 8a—8a in Fig. 8.

Fig. 9 is a view showing in perspective and in disconnected relationship, the parts of the valve structure of the device of Fig. 8.

Fig. 10 is a perspective view of the valve seating disk and closure plug as used in the device of Fig. 8.

Fig. 11 is a vertical section showing a faucet with valve housing of an alternative form of construction.

Fig. 12 is a sectional detail of a valve and valve stem assembly for the device of Fig. 11.

Fig. 13 is a horizontal cross-section of the valve stem just above the valve.

Referring more in detail to the drawings—

In the device of Figs. 1 and 2, 10 designates a valve housing formed with a cylindrical chamber 11 that opens to the upper end of the housing and is closed by a solid wall at its lower end. Cast integral with the housing 1, and extended from opposite sides thereof are pipes 12 and 13 which, respectively, are designed to connect at their outer ends, as later described, with supply pipes through which hot and cold water is supplied under pressure to the valve housing. As shown best in Figs. 2 and 2a, the pipes 12 and 13 communicate with the chamber 11 through passages 14 and 15 which open into the chamber at diametrically opposite locations.

Pressed into the chamber 11 and seated against a spacer ring 16 located in the bottom of the chamber is a carefully machined cylindrical sleeve 17 which extends above the level of the passages 14 and 15 and is formed in its opposite walls with ports 14' and 15' which are in exact registration with the passages 14 and 15, these constituting the hot and cold water inlets.

Fitted rotatably and slidably in the sleeve 17 is the valve member 18 which is of piston type and is fixed on the lower end of the valve operating stem 19, which stem has a reduced lower end portion that extends coaxially through the valve member and is locked therein by a nut 20 threaded onto its lower end and seated against the lower surface of the valve member. A pin 21 is extended through the valve member and stem as seen in Fig. 2 to hold them against relative rotation.

Seated upon the upper end of the valve member 18 is a conical valve gasket 25 of a suitable material through which the valve stem extends, and the stem shoulder is drawn down tightly against the upper end of the valve member by the tightening of the valve securing nut 20; it being shown in Fig. 2 that the reduced lower end portion of the stem 19 extends centrally through the gasket and that the gasket is fitted with a shouldered, metal sleeve 27 that is applied about the stem and against the stem shoulder that is provided by the reduction of its lower end portion.

Threaded into the upper end portion of the valve housing 10 is a plug member 30 which serves various purposes. This plug has an axial passage 31 therethrough and this opens at its lower end into the upper end of the chamber 11 and is formed about its lower end with a conical seat 32 for seating the valve gasket 25 thereagainst to close the faucet against outflow of water therefrom.

The stem 19 of the valve extends upwardly through the passage 31, through a packing gland 34 that is threaded onto the upper end of the plug. The body portion of the plug is cylindrically formed and has an annular outwardly opening channel 35 formed therein and a plurality of radial passages 36 opening from passage 31 into the channel 35. A discharge spout 40 has a head portion 40' mounted on and for rotation about the body of plug 30 and its channel 40'' communicates at its inner end with the channel 35. Also, as noted in Figs. 2 and 3, suitable packing as at 42 and 43, is applied in counterbores 44 formed in the mounting head portion of the spout about the passage provided for receiving the plug therethrough.

It is shown also that the plug 30 has a wrench head portion 30' at its upper end forming an annular shoulder that engages the top surface of the spout head and operates to press it into close contact with the upper end surface of the valve housing, when the plug is tightened into the housing 10. The spout has free swinging adjustment about this plug.

The plug 30 is formed in its upper end with a recess 45 into which a handle mounting cap 46 is threaded. This cap is hollow and receives the upper end portion of the valve stem therein as shown in Figs. 2 and 3, and the stem is there pivotally attached by a pivot screw 47 to a hand lever or handle 48. This lever has a ball end portion 48a that is rotatably contained in the upper end portion of the cap. This head has a transverse slot 49 that receives the upper end of the stem 19 and at one side of the pivotal connection of the stem with the head by screw 47, the head portion of the handle has a fulcrumed pin and slot connection as at 50 in Fig. 3 with a supporting block 51 contained in the cap and freely movable about the stem with the turning movement of the handle.

As best shown in Figs. 2, 3 and 4, the valve member 18 is formed at one side with a cut away portion forming a passage 60. This passage is formed in such manner as to extend through an arc of 180° about the valve and it extends in the longitudinal direction of the valve from near the upper end to slightly below its medial portion. When the valve gasket 25 is seated against the seat 32 formed about the plug passage 31, the transverse passage 60 will be located above the inlets 14' and 15' as shown in Fig. 2, and these will be covered by the solid lower end portion of the member. When the valve member is pushed downwardly, the passage 60 may be brought into communication with the passages 14' and 15' to the full or partial distance thereacross as presently more fully explained.

It will be understood that by the turning of the handle 48 through the arc indicated at $a$ in Fig. 1, the valve stem 19 will be turned accordingly and the valve member 18 may be placed in position to discharge hot water, cold water or a mixture of hot and cold ranging from all hot to all cold. Also, by depressing of the handle, the valve 18 will be moved downwardly to open the passage 31 and to open the inlets by bringing the valve passage 60 into communication therewith; the volume of flow being regulated by the extent of depression.

In order that the opposite rotative adjustments of the valve member 18 may be limited to insure the most satisfactory use of the faucet, I have provided a stop washer 75 which is shown as applied within the chamber 11 about the valve stem and between the upper end of sleeve 17 and inner end surface of the plug 30. This washer, as seen in Fig. 6, is formed at one side with a radial, downwardly pressed rib 76 adapted to seat in a radial slot 77 formed in the top edge of sleeve 17. The washer is of the same diameter as the chamber 11 and fits closely therein and that portion which is opposite the rib 76 is turned up as seen in Figs. 3 and 6 and engages against the plug 30, and thus the washer is held firmly in place. At opposite sides of the rib, the washer is formed with inwardly directed shoulders 78—78 as in Fig. 6a and these project into the cross channeled portion of the valve and operate as stops against which the valve will engage when rotated in opposite directions as indicated in Fig. 6a thus to limit its extent of turning.

To provide for the equalization of pressure against opposite ends of the valve, I provide a longitudinal groove 79 therein as shown in Fig. 4. This admits water under pressure to the lower end of the valve which will operate to retain the valve seated without any requirement for use of springs. Also, this longitudinal groove, when engaged with either inlet in the sleeve, will automatically close the valve. This is done by pressure passing through the groove and being blocked off under the valve, thereby closing it.

In Figs. 7 to 10, I have shown a valve mechanism in which the same objects of the invention have been embodied. In this device the valve housing 10a comprises a valve chamber 11a that is closed at its lower end and in which a cylindrical valve sleeve 17' is pressed in a secure tight fit. The valve chamber terminates below the upper end of the housing and is there closed by a disk 81 formed with a central opening 81' about which a downwardly facing conical seat 82 is formed. This disk is held tightly seated in the upper end of the chamber by means of a plug 85 that is threaded onto an upper end opening 86 of the valve housing and is tightened against the flat upper end surfaces of a plurality of parts 87 that extend upwardly from the disk 81 about the central opening therein as shown best in Fig. 10.

Water that flows out through the disk opening is discharged through a valve housing passage 88, shown in Fig. 8, that leads to a threaded outlet 89 into which a pipe may be threaded.

The parts making up the valve member of the device of Fig. 8 are shown best in Figs. 8 and 9 wherein it is shown that the valve member 18' is fixed on a valve stem 19' which extends upwardly through a packed gland 91 in the plug 85, and at its upper end is fixed by a pivot screw 92 in a cross slot 93 in the ball shaped head portion 94' of a handle 94. The head portion of the handle has a pin and slot connection, as at 95, with a supporting block 96 that is contained in a cap 97 that is threaded onto the upper end of the plug, and which block can move with the handle as it is rotated about the axial line of the stem. Upward pull on the outer end of the handle will cause a downward movement of the stem for unseating the valve member from the disk seat 82.

Fig. 8 shows the valve member 18' to be equipped with a sealing gasket 25' like that of the faucet of Fig. 2. It also shows the valve member to be formed with a transverse channel 60' corresponding to that of valve 18 and adapted to be registered with the hot and cold water ports in the valve sleeve.

To lock the valve stem and valve against relative rotation, I provide the lower end portion of the stem with a key slot 98 and the valve body with a lower end recess 99 adapted to receive a flat plate 99a therein. The plate is formed with an opening 99b to receive the lower end of the stem therethrough, and a key 99c projects from the plate into this opening and extends into the key slot 98. The plate is designed to fit snugly in the recess 99 and to be locked there by the tightening of a nut 100 onto the lower end of the stem against the valve plug, as seen in Fig. 8. The plate 99 then acts to lock the valve and stem against rotation relative to each other.

To facilitate the connection of the faucet to the hot and cold water supply lines that are designated in Fig. 1 by the words "hot" and "cold," I have provided the connecting means comprising, for each connection, a short nipple 110 having axially offset opposite end portions 110a and 110b. The end 110a is threaded onto a supply pipe while the ends 110b, which are formed with encircling shoulders 115, are contained within short fittings 116 that are interiorly threaded for application to the exteriorly threaded ends of pipes 12 and 13. By proper rotative adjustment of the nipples 110, any slight adjustment that is required to bring the nipples to the exact spacing of the pipes 12 and 13 may be made and the fixture brought to a level condition.

The fittings 116 are exteriorly threaded and are adapted to receive the interiorly threaded end portion of an escutcheon 120 thereover. When it is desired to disconnect the faucet, the escutcheons are unthreaded and slipped onto the pipes 12 and 13, giving easy access to the parts 116 for their disconnection.

In Figs. 12 and 13, I have shown, as an alternative construction, a valve and stem assembly in which the stem is of uniform diameter and the valve body 128 is locked thereto by novel means. In this detail, the stem 125 is formed with a square cut, encircling channel 126, and fitted therein is a U-shaped washer 127. The valve body 128 is like the body 18 of the device of Fig. 2. It is applied to the lower end portion of the stem and it is equipped at its upper end with a conical valve member 129 upon which a washer 130 is seated. The washer 130 has an upwardly extended, peripheral flange 131 in which the washer 127 is seated and thereby retained from displacement from the stem groove, and a nut 132 is threaded onto the lower end of the stem, against the valve body, to hold the parts in assembled relationship.

Explanatory to the showing of the valve housing in Fig. 11, it will be stated that the use of the sleeve 17 in the device of Fig. 2 is for manufacturing expediency as it is easier to machine and insert the sleeve than to machine the interior of the housing. However, in some instances, it may be desirable to eliminate the sleeve and in such case, the housing would be made as in Fig. 11, wherein it is shown that the upper end portion of the chamber is diametrically enlarged to provide for easy outflow of water past the valve and to the outlet 31 when the valve is in an open position.

Assuming the faucets to be so constructed, it will be understood that in the normal position of the valve 18, both hot and cold water inlets 14 and 15 will be closed. By depressing the handle of the device of Fig. 1, or by pulling up on the handle of the device of Fig. 8, the valve 18 will be moved downwardly to unseat it from the outlet and to uncover the inlet ports. The flow of water through the faucet will be determined by the extent to which the inlets are uncovered, and the mixture of hot and cold will be in accordance with the rotative adjustment of the valve between those positions at which all cold or all hot water is admitted.

Water flows out through the valve passage into the plug passage 31 and into the swing spout and this may be swung aside from side to side to best suit the user.

Having thus described my invention, what I claim as new therein and desire to secure by Letters Patent is:

1. A mixing valve comprising a casing having a cylindrical chamber therein, the upper part of said chamber being of substantially larger diameter than the lower part and having a discharge port at its upper end, and there being a plurality of fluid ports in the casing and extending to the inner periphery of the smaller portion of the chamber, a reciprocally movable piston in the smaller portion of the chamber and extending into the enlarged portion of the chamber in spaced relation to the wall of the upper large portion of said chamber and formed at its upper end with a valve cooperating with the said discharge port; one side of said piston being recessed and forming a passage of communication between the ports and the enlarged portion of the chamber when the piston is moved downwardly and means for reciprocating and rotating said piston.

2. A mixing chamber as in claim 1 wherein the portion of the cylindrical chamber that is of smaller diameter is formed by a cylindrical bushing of hard steel, having ports in communication with the ports of the casing, and a spacing member between the bushing and bottom of the casing chamber forming a downward limiting means for the bushing when pressed to position in the lower end of the casing.

3. A mixing valve comprising a casing having a cylindrical, vertical chamber therein, the upper part of said chamber being substantially greater in diameter than the lower part and constituting a mixing chamber, a closure for the upper end of the chamber having a central discharge port formed with a valve seat and there being a plurality of fluid ports in the casing and opening into the smaller portion of the chamber in circumferentially spaced relationship, a piston reciprocally fitted in the smaller portion of the chamber and extending into the larger portion in spaced relation to the wall of the large chamber above the small chamber, a valve member on the piston cooperating with said discharge port and valve seat, one side of said piston having a transverse recess therein, above the level of entry of said fluid ports into the chamber when the valve member is seated, and providing a passage of communication between said ports and the mixing chamber when the valve is opened by moving the piston downwardly, and a stem for said piston extended through the said discharge port and whereby the piston may be rotatably anid reciprocally adjusted.

4. A valve housing formed with a cylindrical valve chamber having a lower part of one diameter and an upper part of a diameter substantially larger than that of the lower part and having a discharge port at its upper end, and said housing having water inlet ports opening therethrough into the lower part of the chamber, a piston valve reciprocally and rotatably movable in the portion of the chamber of smaller diameter and extended into the portion of larger diameter, and adapted to close the said discharge port, and to be moved downwardly therefrom to open said port; said piston valve having a recess thereacross in its upper end portion which may be selectively brought into communication with the water inlet by the rotative adjustment and downward movement thereof, and said recess being so formed along the piston as to open at all positions of its movement with both the larger and smaller portions of the valve chamber, and a stop member fixed in the chamber with a part thereof extended into the recess of the piston valve to be engaged by the end wall of said recess therein to limit the extent of rotation of the valve.

5. A structure as in claim 4 wherein the said stop member is of annular form, disposed about the valve piston in the portion of larger diameter of the chamber, and including means thereon to interlock with the chamber to prevent the rotation, of the stop member, and with means at its inner edge extended into the said recess to limit the extent of rotation of the valve.

6. A faucet of the character described comprising a housing providing therein a cylindrical chamber, closed at one end and having its opposite end fitted with a closure member formed with a central outlet and an inwardly facing valve seat about the outlet, a cylindrical sleeve, press fitted in the chamber and having an end surface spaced from the said closure member to provide a water mixing space between them; said housing and sleeve having hot and cold water inlets, respectively, opening therethrough into the sleeve at directly opposite locations therein, a valve body rotatably and longitudinally adjustable in the sleeve and extended across said inlets as a closure therefor and having an end surface adapted to close against said valve seat, and having a transverse passage therein, open to the side of the body through an arc of about 180° and so located relative to the seat as to be out of communication with said inlets when the valve body is closed against the valve seat, but adapted to be moved into communication therewith to more or less extent by longitudinal adjustment of the body, and to be selectively brought into communication with either one or with both inlets to more or less extent by rotative adjustment of the body; said transverse passage being of such width in the longitudinal direction of the body as to maintain partial communication with the said mixing space in all open positions of the valve body, and an adjusting stem for the valve body.

7. A faucet as recited in claim 6 wherein the valve body has a longitudinal channel from end to end and open to that side thereof which is directly opposite the transverse channel of the body, and which will be moved into communication with the inlet that is closed by the valve body when the latter is rotated beyond the initial position of full opening with respect to the opposite inlet.

ALFRED MELVIN MOEN.

REFERENCES CITED

The following references are of record in the file of this patent:

UNITED STATES PATENTS

| Number | Name | Date |
|---|---|---|
| 781,525 | Isaacs | Jan. 31, 1905 |
| 1,016,382 | Weeden | Feb. 6, 1912 |
| 1,693,758 | Hennessey | Dec. 4, 1928 |
| 1,865,517 | Henderson | July 5, 1932 |
| 1,943,865 | Hennessey | Jan. 16, 1934 |
| 1,945,645 | Kumpman | Feb. 6, 1934 |
| 2,035,898 | Kniskern | Mar. 31, 1936 |
| 2,087,223 | Thompson | July 13, 1937 |
| 2,220,170 | Nelson | Nov. 5, 1940 |
| 2,373,702 | Moen | Apr. 17, 1945 |

FOREIGN PATENTS

| Number | Country | Date |
|---|---|---|
| 293,843 | Great Britain | of 1927 |